March 24, 1931.     A. MOORHOUSE     1,798,100
MOTOR VEHICLE
Filed Dec. 18, 1924
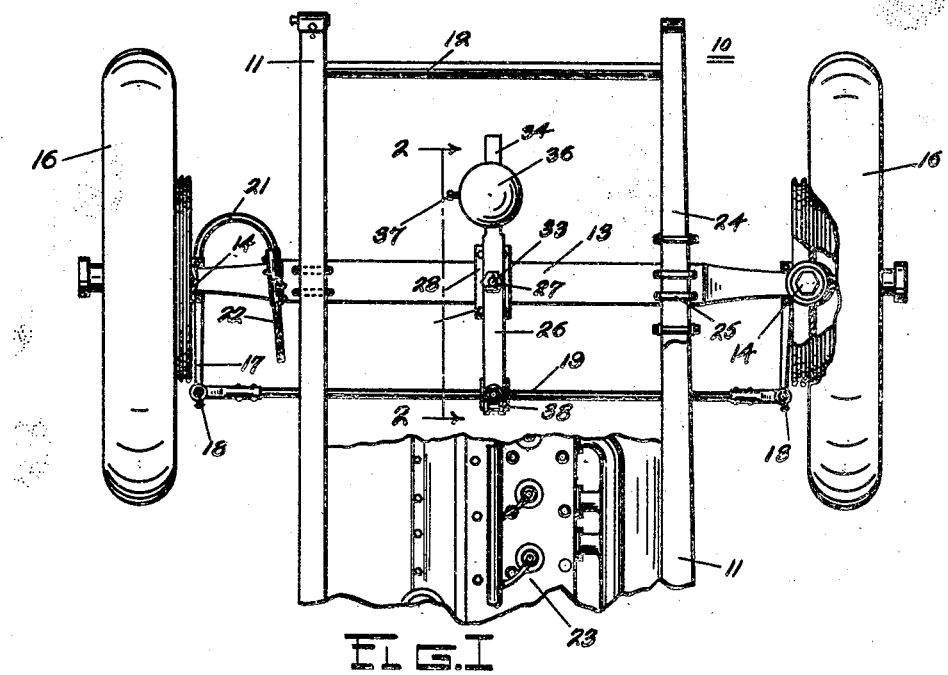
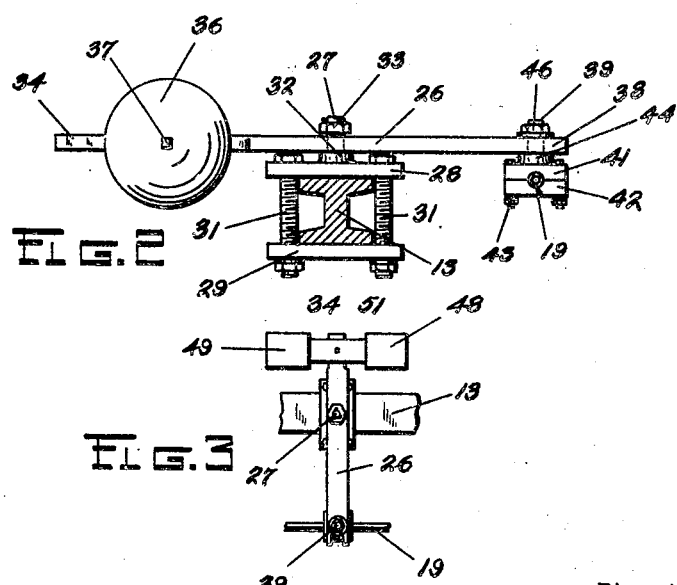
Inventor
Alfred Moorhouse
By Milton Tibbetts
Attorney Patented Mar. 24, 1931

1,798,100

UNITED STATES PATENT OFFICE

ALFRED MOORHOUSE, OF DETROIT, MICHIGAN, ASSIGNOR TO PACKARD MOTOR CAR COMPANY, OF DETROIT, MICHIGAN, A CORPORATION OF MICHIGAN

MOTOR VEHICLE

Application filed December 18, 1924. Serial No. 756,632.

This invention relates to motor vehicles and particularly to the steering apparatus thereof, and it has for its principal object to provide apparatus by means of which rapid oscillatory vibration of the front wheels of the vehicles about their steering axes may be eliminated.

In modern motor vehicles, particularly those equipped with large, low pressure tires of the balloon type, it frequently happens that at certain speeds of the vehicle a rapid oscillation of the front wheels on their pivotal mountings is set up, taking the form of an oscillatory vibration of considerable amplitude, which is destructive to the various parts of the vehicle, is exceedingly uncomfortable, and which increases the difficulty of steering to a point at which operation of the vehicle is quite dangerous. This phenomenon has come to be known in the art as "shimmy" and it will be hereafter so referred to in this specification.

Although the exact causes underlying front wheel shimmy are somewhat obscure, it is probable that the vibration may derive its initial excitement from a bump or unevenness of the road, from under-inflation of one of the front tires or for some other reason causing one of the front vehicle springs to be sharply deflected. The deflection and recoil of the spring causes the front axle to describe a pitching motion transversely of the vehicle and at certain road speeds this pitching motion becomes synchronized with the natural period of vibration of the wheels, axle and springs, causing the axle to vibrate violently in the vertical plane of its length. Combined with the rotational movement of the wheels this motion produces a gyroscopic effect, setting up forces which act upon the wheels in a direction at right angles to the other forces, so that the wheels tend to oscillate about the steering knuckles upon which they are pivotally mounted, in synchronism with the pitching of the axle. This shimmying motion may assume such proportions at certain road speeds of the vehicle as to cause it to shake violently, preventing proper steering, and producing the ill effects above noted.

By the present invention is provided a device which sets up forces that tend to oppose the shimmying motion of the vehicle wheels. This resistance is communicated to the wheels preferably through the steering mechanism by which they are connected.

Other objects of the invention will appear from the following description taken in connection with the drawing, which forms a part of this specification, and in which Fig. 1 is a plan view of a portion of the chassis of a motor vehicle, partly broken away to show the front axle and steering mechanism thereof, and equipped with the present invention;

Fig. 2 is a view in transverse section through the front axle of the motor vehicle, substantially on the line 2—2 of Fig. 1, and Fig. 3 is a detail view illustrating the construction of a modification of this invention.

In the drawing, 10 represents the forward portion of the chassis of a motor vehicle having the usual side frame members 11 connected by suitable cross frame members 12. At 13 is shown the front axle of the vehicle, provided at its ends with suitable steering knuckles 14 on which are rotatably mounted the front vehicle wheels 16 in the usual manner. Each of the steering knuckles 14 has a rearwardly disposed steering arm 17, adapted for pivotal connection as at 18 to a steering tie rod 19, and the left hand steering knuckle is also provided with a steering arm 21 by means of which it is connected to a drag link 22, adapted for operation by the vehicle steering gear (not shown) in a manner well understood in the art to which this invention relates. An engine 23 of the usual type, broken away to show the parts beneath, is also mounted on the chassis 10 between the frame members 11.

It will be understood that the vehicle axle 13 is connected to the side frame members 11 by springs 24 which are disposed beneath the frame members, these springs being clamped to the axle by means of clip bolts 25, and connected at each end to the frame members in any suitable way.

Pivotally mounted on the front axle 13 is an inertia damping device. As shown, this comprises a lever 26 having a bearing intermediate its ends for cooperation with a vertically disposed pivot pin 27, so that the lever may oscillate about the pin in a horizontal plane. The pin 27 may be secured to the axle in any suitable manner, but is preferably clamped thereto. In the embodiment shown, this pin is formed integrally with or otherwise rigidly secured to a clamp plate 28, seating on the upper face of the axle 13. A cooperating plate 29 is seated on the lower face of the axle, and these plates are drawn into clamping engagement with the axle by bolts 31. The upper plate 28 is formed with a lug 32 from which the pin 27 projects, the upper face of which forms a support for the lever 26. The upper end of the pin 27 is threaded for the reception of a nut 33, by which the lever is retained on the pin.

The forward end of the lever 26 has a portion 34, preferably polygonal in cross section, on which an appropriate weight 36 is mounted. This weight may be adjusted at various points on the lever portion 34 and may be locked in adjusted position by means of a set screw 37. The rearwardly disposed end of the lever 26 is adapted for connection to the steering tie rod 19 in any convenient manner. As shown, this end of the lever 26 is formed with a forked portion 38 adapted to embrace a vertically disposed pin 39 which is rigidly clamped to the tie rod 19, the pin being mounted on a clamp having upper and lower members 41 and 42 which are drawn into engagement with the tie rod by bolts 43. The clamp member 41 is formed with a lug 44 providing a shoulder against which the fork 38 may rest, and it is threaded at its upper end to receive a retaining nut 46.

It will be evident that in the operation of the vehicle, movements of the tie rod 19 transversely of the vehicle frame, correspond to oscillatory movements of the wheels about the pivots 14, and that such movements are transmitted through the tie rod clamp and the pin 39 to the lever 26, which will be oscillated about its pivotal mounting on the pin 27, so that the weight 36 will have a movement in the arc of a circle. Movements of the rod 19 caused by steering of the vehicle are executed relatively slowly, so that the inertia of the weight 36 which is moved thereby will have no appreciable effect upon the steering of the vehicle. However, upon the commencement of a front wheel shimmy, the rod 19 will be given a violent reciprocation of relatively high frequency in the direction of its length, caused by the rapid oscillation of the wheels 16 on their pivots 14 during this phenomenon. The inertia of the weight 36, however, exercises a powerful damping effect on this vibration. By increasing the moment arm of the weight on the lever 27, as by adjusting it forwardly on the portion 34, the inertia forces set up during this shimmying motion may be readily made of sufficient magnitude to completely damp out the oscillatory vibration of the wheels and their associated steering mechanism. As the damping device is constantly connected to the steering mechanism, the damping effect is exerted at the inception of a shimmy and immediately stops this motion, restoring the wheels and steering mechanism to their normal condition.

In Fig. 3 is illustrated a modified form of the invention in which two weights 48 and 49, are connected by a cross member 51 which is adjustably mounted on the forwardly extending portion 34 of the lever 26. In this manner a larger damping mass may be secured, having a longer effective lever arm without unduly increasing the length of the lever 26 and thus subjecting the pins 27 and 39 to unnecessary strains during operation of the vehicle over rough roads.

It will be apparent that this invention provides a device for the elimination of wheel shimmy, which is simple and effective, which is inexpensive to manufacture, and which does not affect the steering of the vehicle.

It will be understood that various forms of the invention other than those described above may be used without departing from the spirit or scope of the invention.

What is claimed is:

1. The combination with a motor vehicle having an axle and knuckle members at the ends thereof providing wheel bearings of wheels rotatably mounted on said bearings, steering arms on the knuckle members, a steering tie rod connecting said arms, a lever pivotally mounted on said axle having one end connected to the tie rod, and a weight on the other end of the lever.

2. The combination with a motor vehicle having an axle with wheels pivotally mounted thereon, a frame, springs supporting the frame from said axle, and steering connections between said wheels, of an inertia damping device comprising a weighted lever directly connected to the steering connection to oppose vibratory motion thereof.

3. The combination with a motor vehicle having an axle and knuckle members at the ends thereof providing wheel bearings, of wheels rotatably mounted on said bearings, steering arms on the knuckle members, a steering tie rod connecting said arms, a pivot member removably secured to the axle, a lever mounted for oscillation on said pivot member and having a slot in one end thereof, a pin clamped to the tie rod engaging said slot, and a weight member adjustably secured to the other end of the lever.

4. In a motor vehicle, the combination with the frame thereof, the front axle, the springs connecting the axle and frame, and the steering knuckles and wheels pivotally mounted at the ends of the axle, some of said elements when the vehicle is in use being subjected to objectionable vibratory movements, of means for eliminating the bad effects of said vibratory movements comprising a movable weighted member mounted independent of the springs and with its mass well forward of said front axle and so closely connected to one of the vibrating elements as to exercise a powerful direct damping effect thereon.

5. In a motor vehicle, the combination with the frame thereof, the front axle, the springs connecting the axle and frame, and the steering knuckles and wheels pivotally mounted at the ends of the axle, some of said elements when the vehicle is in use being subjected to objectionable vibratory movements, of means operated by and adapted to eliminate the bad effects of said objectionable vibratory movements comprising a movable weighted member mounted independent of the springs and with its mass well forward of said front axle and so closely connected to one of the vibrating elements as to exercise a powerful direct damping effect thereon.

6. In a motor vehicle, the combination with the frame thereof, the front axle, the springs connecting the axle and frame, the steering knuckles and wheels mounted at the ends of the axle, and the steering tie rod connecting the steering knuckles, some of said elements forming a vibratory system set in motion when the vehicle is operating, of means for eliminating the bad effects of the vibration of said elements comprising an inertia damping device mounted with its mass forward of the axle and being directly connected to said steering tie rod.

7. In a motor vehicle, the combination with the frame thereof, the front axle, the springs connecting the axle and frame, and the steering knuckles and wheels pivotally mounted at the ends of the axle, some of said elements when the vehicle is in use being subjected to objectionable vibratory movements, of means for eliminating the bad effects of said vibratory movements comprising a pair of movable weights mounted independent of the spring and on either side of the central longitudinal axis of the car with their masses well forward of said front axle and so closely connected to one of the vibrating elements as to exercise a powerful direct damping effect thereon.

In testimony whereof I affix my signature.

ALFRED MOORHOUSE.